(12) United States Patent
Subramanya et al.

(10) Patent No.: US 9,613,371 B2
(45) Date of Patent: Apr. 4, 2017

(54) DYNAMIC TAXONOMY GENERATION WITH DEMAND-BASED PRODUCT GROUPS

(71) Applicant: Wal-Mart Stores, Inc., Bentonville, AR (US)

(72) Inventors: Shankara B. Subramanya, Sunnyvale, CA (US); Guoxun Yuan, Sunnyvale, CA (US); Madhusudan Mathihalli, Saratoga, CA (US); Ron Tal, Pleasant Hill, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 259 days.

(21) Appl. No.: 14/475,325

(22) Filed: Sep. 2, 2014

(65) Prior Publication Data

US 2016/0063590 A1   Mar. 3, 2016

(51) Int. Cl.
*G06F 17/30* (2006.01)
*G06Q 30/06* (2012.01)
*G06Q 10/08* (2012.01)

(52) U.S. Cl.
CPC ... *G06Q 30/0623* (2013.01); *G06F 17/30734* (2013.01); *G06F 17/30873* (2013.01); *G06F 17/30958* (2013.01); *G06Q 10/087* (2013.01)

(58) Field of Classification Search
CPC ......... G06F 17/30961; G06F 17/30873; G06F 17/30734; G06F 17/30958; G06Q 10/087; G06Q 30/0623
See application file for complete search history.

(56) References Cited

U.S. PATENT DOCUMENTS

| 7,809,672 B1 * | 10/2010 | Tenorio | G06Q 30/06 |
| | | | 705/26.64 |
| 8,700,495 B2 * | 4/2014 | Battle | G06Q 30/00 |
| | | | 705/26.1 |

(Continued)

OTHER PUBLICATIONS

Wooldridge, Introductory Econometrics, 2008, 4th Ed., Chapter 10.*

(Continued)

*Primary Examiner* — Robert Beausoliel, Jr.
*Assistant Examiner* — Hau H Hoang
(74) *Attorney, Agent, or Firm* — Bryan Cave LLP

(57) ABSTRACT

A method of extending an existing product taxonomy for an inventory of products. The existing product taxonomy can include pages having a hierarchical tree structure. The method can include determining a first set of keywords. The first set of keywords can be a prediction of keywords searched above a predetermined threshold during a predetermined time period of one or more external search engines. The method also can include generating dynamic product groups based on the first set of keywords. The method further can include generating a relation graph of the dynamic product groups. The relation graph can include relation links between the dynamic product groups. The method also can include linking the dynamic product groups to pages in the existing product taxonomy to generate an extended product taxonomy. The extended product taxonomy can include the existing product taxonomy, the dynamic product groups, and the relation links of the relation graph between the dynamic product groups. The method further can include presenting to a user information about the dynamic product groups. Other embodiments are provided.

17 Claims, 12 Drawing Sheets

(56) References Cited

U.S. PATENT DOCUMENTS

| | | |
|---|---|---|
| 2010/0145961 A1 | 6/2010 | Hu et al. |
| 2011/0015990 A1* | 1/2011 | Sanghavi ............... G06Q 30/02 705/14.43 |
| 2011/0276581 A1* | 11/2011 | Zelevinsky .............. G06N 5/02 707/766 |
| 2013/0133056 A1* | 5/2013 | Taylor ..................... G06F 21/41 726/8 |
| 2014/0129547 A1 | 5/2014 | Sacco |

OTHER PUBLICATIONS

Jan Schulz, Jaccard Similarity, May 15, 2008 available at http://www.code10.info/index.php%3Foption%3Dcom_content%26view%3Darticle%26id%3D60:article_jaccard-similarity%26catid%3D38:cat_coding_algorithms_data-similarity%26Itemid%3D57.*

Information gain in decision trees—Wikipedia, the free encyclopedia, http://en.wikipdia.org/wiki/Information_gain_in_decision_trees, Aug. 25, 2014.

DBSCAN—Wikipedia, the free encyclopedia, http://en.wikipedia.org/wiki/DBSCAN, Aug. 25, 2014.

Tf-idf—Wikipedia, the free encyclopedia, http://en.wikipedia.org/wiki/Tf%E2%80%93idf, Aug. 25, 2014.

U.S. Appl. No. 14/042,340 to Subramanya, filed Sep. 30, 2013.

* cited by examiner

DYNAMIC TAXONOMY GENERATION WITH DEMAND-BASED PRODUCT GROUPS

TECHNICAL FIELD

This disclosure relates generally to commerce in a computer network system, and relates more particularly to dynamic taxonomy generation with demand-based product groups.

BACKGROUND

Modern consumers have a plethora of choices when selecting products to purchase. Generally, online retailers create webpages using product-driven approaches, such as clustering of products in inventory based on product types and attributes, instead of demand-driven approaches. For example, an iPod can have an MP3 player product type, and can have attributes such as black or white color attributes. Each webpage can display a list of similar products in the same cluster. These webpages can then be organized in a hierarchical tree structure based on hypernym dependency to generate a product taxonomy. Although there are several design criteria for creating a product taxonomy, an important criterion is intuitiveness, which can allow inexperienced customers to be able to easily locate the product type they are looking for by browsing the taxonomy.

Although the taxonomy can be intuitive for ease of browsing, the product webpages may not have high visibility to customers outside the website domain of the online retailer. In many cases, customers searching for a product start by doing a keyword search in an external search engine, such as Google, Yahoo, or Bing. Often, these customers use keywords as a query for product search, product feature comparison, price comparison, etc. To be listed as a high-ranked result on one or more of these external search engines and thus increase exposure to potential online customers, the online retailer's internal webpages need to have greater relevance for search queries on the external search engines.

The demand for products generally changes dynamically over time, and the demand in a market generally dominates the overall product-related traffic at external search engines. Yet product taxonomies at online retailers are generally relatively static in nature because they are created using product-driven, instead of demand-driven, approaches and because returning customers generally prefer a known taxonomy. Over time, the taxonomy may gradually evolve due to changes in clustering similarity metrics and/or changes in hypernym relationships, but these approaches generally do not take into consideration the current market demand. Furthermore, the hierarchical tree structure of the product taxonomy can limit the relationships between groups of products.

BRIEF DESCRIPTION OF THE DRAWINGS

To facilitate further description of the embodiments, the following drawings are provided in which:

FIG. 7 illustrates an exemplary webpage showing a dynamic product group, according to the embodiment of FIG. 3;

FIG. 8 illustrates an exemplary webpage showing a mashup group, according to the embodiment of FIG. 3;

Figure 1:
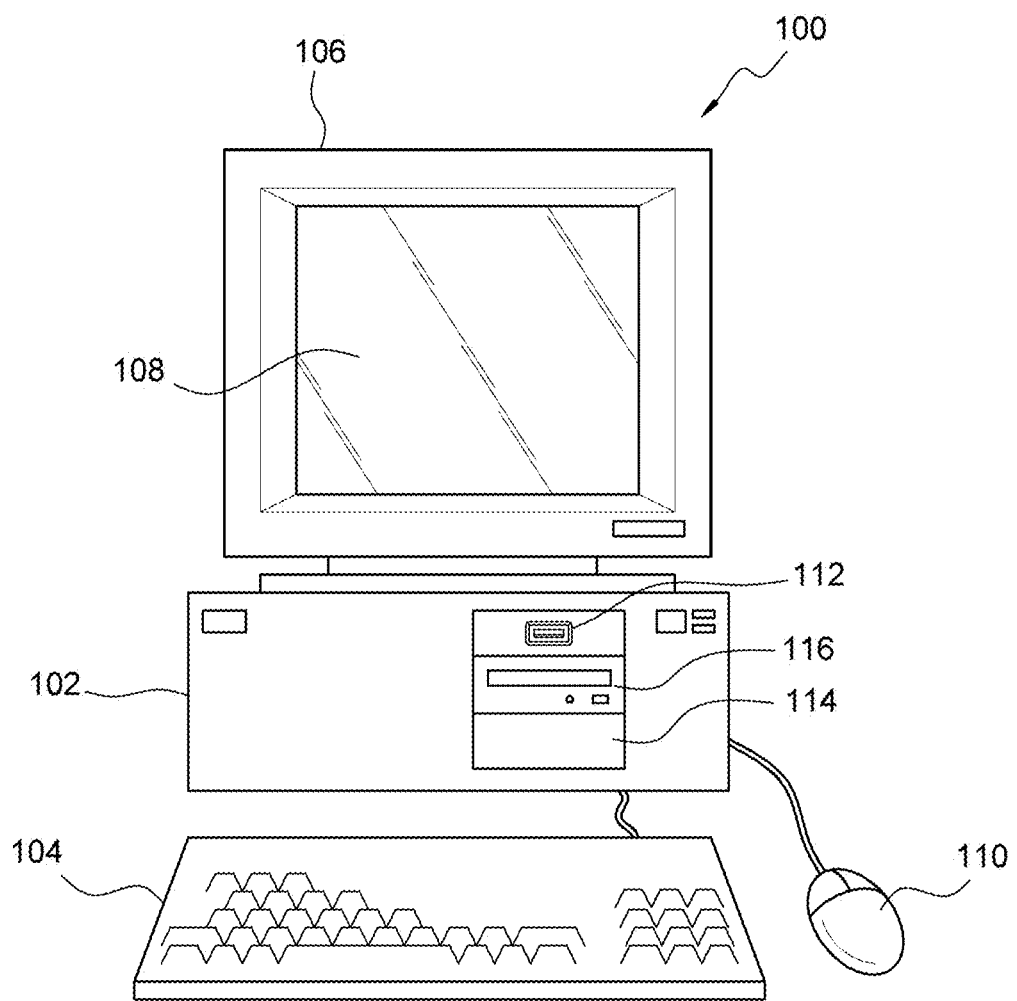
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method of extending an existing product taxonomy for an inventory of products. The existing product taxonomy can include pages having a hierarchical tree structure. The method can be implemented via execution of computer instructions configured to run at one or more processing modules and configured to be stored at one or more non-transitory memory storage modules. The method can include determining a first set of keywords. The first set of keywords can be a prediction of keywords searched above a predetermined threshold during a predetermined time period of one or more external search engines. The method also can include generating dynamic product groups based on the first set of keywords. The method further can include generating a relation graph of the dynamic product groups. The relation graph can include relation links between the dynamic product groups. The method also can include linking the dynamic product groups to pages in the existing product taxonomy to generate an extended product taxonomy. The extended product taxonomy can include the existing product taxonomy, the dynamic product groups, and the relation links of the relation graph between the dynamic product groups. In many embodiments, the relation graph can be any suitable representation of the dynamic product groups and relation links between the dynamic product groups, such as a graph abstract data structure, which can be implemented as an adjacency list, and adjacency matrix, an incidence matrix, linked nodes, a table, or another suitable implementation. The method further can include presenting to a user information about the dynamic product groups.

A number of embodiments can include a system for extending an existing product taxonomy for an inventory of products. The existing product taxonomy can include pages having a hierarchical tree structure. The system can include one or more processing modules and one or more non-transitory memory storage modules storing computing instructions configured to run on the one or more processing modules and perform one or more acts. The one or more acts can include determining first set of keywords. The first set of keywords can be a prediction of keywords searched above a predetermined threshold during a predetermined time period of one or more external search engines. The one or more acts also can include generating dynamic product groups based on the first set of keywords. The one or more acts further can include generating a relation graph of the dynamic product groups. The relation graph can include relation links between the dynamic product groups. The one or more acts also can include linking the dynamic product groups to pages in the existing product taxonomy to generate an extended product taxonomy. The extended product taxonomy can include the existing product taxonomy, the dynamic product groups, and the relation links of the relation graph between the dynamic product groups The one or more acts further can include presenting to a user information about the dynamic product groups.

Figure 2:
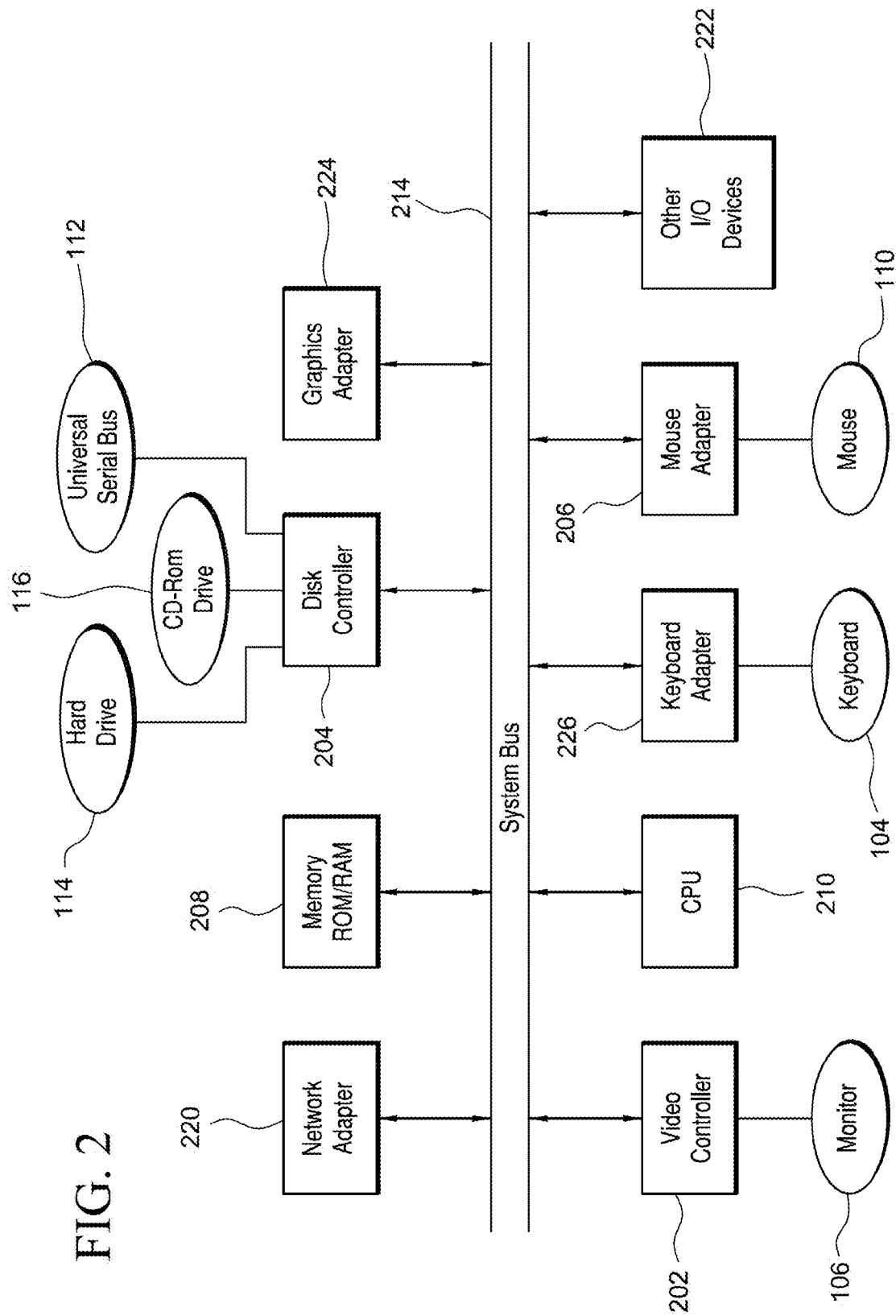
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
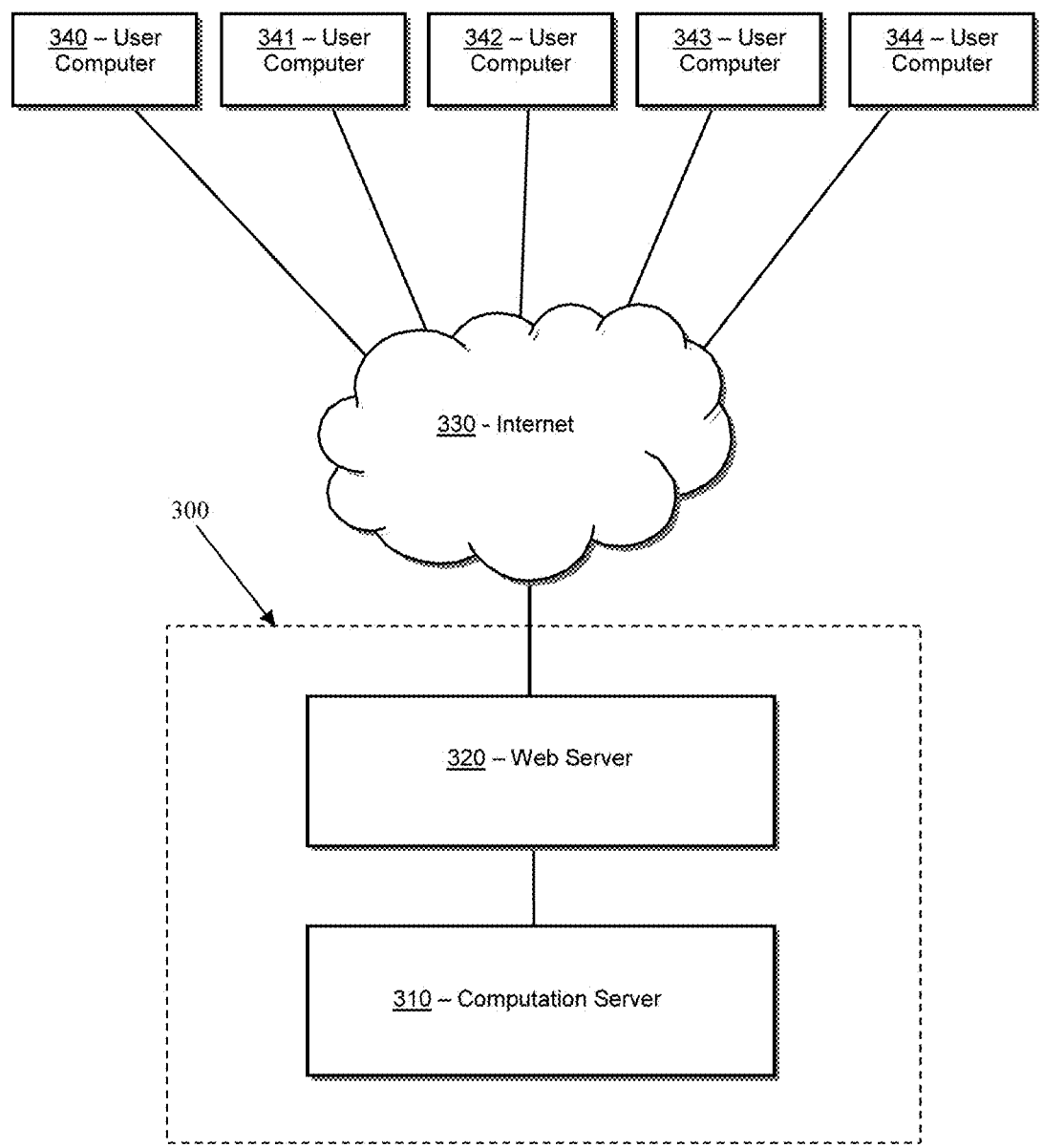
FIG. 3 illustrates a block diagram of a system, which can be employed for extending an existing product taxonomy for an inventory of products, according to an embodiment.

Turning ahead in the drawings, FIG. 3 illustrates a block diagram of a system 300, which can be employed for extending an existing product taxonomy for an inventory of products, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300.

In some embodiments, system 300 can include a computation server 310 and/or a web server 320. Web server 320 and/or computation server 310 can each be a computer system, such as computer system 100 (FIG. 1), as described above, and can each be a single computer, a single server, or a cluster or collection of computers or servers, or a cloud of computers or servers. In a different embodiment, all of parts of computation server 310 and web server 310 can be integrated into a single computer, a single server, the same cluster or collection of computers or servers, or the same cloud of computers or servers. Additional details regarding computation server 310 and web server 320 are described herein.

In many embodiments, web server 320 can be in data communication through Internet 330 with user computers (e.g., 340, 341, 342, 342, 344). In certain embodiments, user computers 340-344 can be desktop computers, laptop computers, smart phones, tablet devices, and/or other endpoint devices. In many embodiments, web server 320 can host one or more websites. For example, web server 320 can host an eCommerce website for an online retailer that can allow users to browse and/or search for products, to add products to an electronic shopping cart, and/or to purchase products, in addition to other suitable activities. In various embodiments, the set of products offered for sale through the website can be an inventory of products.

In several embodiments, various products sold through the website can include a title, an image, a free form description, and/or a structure map of attributes and values. For example, a certain TV product can have, at least in part, the following attributes and values:

| ATTRIBUTE | VALUE |
|---|---|
| Brand | Sceptre |
| Color | Black |
| Screen Size | 30"-39" |
| Screen Size Raw Unit | " |
| Refresh Rate | 60 Hz |
| Category | TV |

Each set of attributes and values is an attribute-value pair. For example, "Brand" is an attribute, and "Sceptre" is the value associated with the attribute, such that "Brand" and "Sceptre" form an attribute-value pair. The attribute-value pairs associated with the products can enable the website to provide improved searching and/or browsing for the products.

In many embodiments, the inventory of products can be classified in a product taxonomy with a multi-layered hierarchy. For example, a first hierarchy level of the product taxonomy can represent general departments, such as clothing, electronics, grocery, home improvement, jewelry, toys, etc. Each first hierarchy level can include many products. Each subsequent hierarchy level of the product taxonomy after the first level can be progressively more specific and include fewer products. In many embodiments, the second hierarchy level can represent broad categories of products within a department. For example, under a department of clothing, the second level hierarchy can include accessories, baby, boys, girls, intimates, maternity, men's, women's, etc. In several embodiments, a third hierarchy level can represent subcategories of products within a category. For example, under the category of accessories, the third level hierarchy can include bandanas, belts, cold weather accessories, gloves, hats & headwear, scarves, etc. In many embodiments, each product can be classified in the product taxonomy and include a first hierarchy level, one or more intermediate hierarchy levels, and a last hierarchy level. In many embodiments, the last hierarchy level can be a product type of the product.

Figure 4:
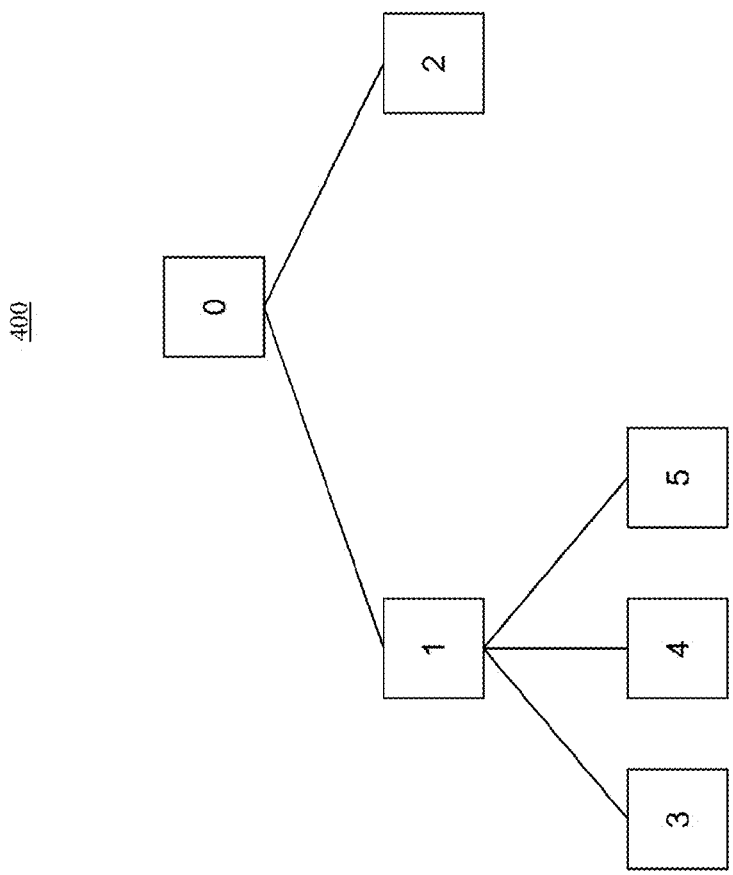
FIG. 4 illustrates an exemplary portion of an existing product taxonomy, represented as a tree structure, according to the embodiment of FIG. 3.

Turning ahead in the drawings, FIG. 4 illustrates an exemplary portion of an existing product taxonomy 400, represented as a tree structure, according to an embodiment. Existing product taxonomy 400 is merely exemplary and embodiments of the system are not limited to the embodiments presented herein. The existing product taxonomy can be employed in many different embodiments or examples not specifically depicted or described herein. For example, in many embodiments, the tree structure of the existing product taxonomy can include various nodes, such as nodes 0-5. In many embodiments, node 0 can be in a first level hierarchy, which can represent general departments. Nodes 1-2 can be in a second level hierarchy level, which can represent broad categories within the department represented by node 0. Nodes 3-5 can be in a third level hierarchy, which can represent subcategories within the category represented by node 1. In many embodiments, existing product taxonomy 400 can be large, and nodes 0-5 can represent a small portion of existing product taxonomy 400 for illustrative purposes.

In a number of embodiments, each node of existing product taxonomy 400 can be represented by a webpage that includes the products that are classified within that node. In many embodiments, each of the products classified within a node of existing product taxonomy 400 can include each of the products classified within the child nodes within the subtree rooted at the node. For example, node 1 can include all of the products within nodes 3, 4, and 5. In several embodiments, the product taxonomy levels can be based on hypernym dependency and/or intuitiveness so that inexperienced customers can be able to easily locate a product type through browsing the taxonomy. In many embodiments, each of the nodes can represent a clustering of products, based on product-driven approaches, such as product similarity and/or hypernym relationships. In many embodiments, the clustering of products in existing product taxonomy 400 is not based on product demand within the market. In several embodiments, the webpages corresponding to the nodes in existing product taxonomy 400 can be used to browse the inventory of products. In a number of embodiments, existing product taxonomy 400 can be relatively static, which can benefit returning customers who have learned the structure of existing product taxonomy 400.

In several embodiments, the clustering of products within the nodes of existing product taxonomy 400 can be course-grained rather than fine-grained. For example, the department of Toys can include a category of Action Figures and/or a category of Spider-Man Toys, but does not include a category or subcategory of Spider-Man Action Figures. As another example, the department of Patio & Garden can include a category of Trimmers & Edgers, which can be a broad category that include several different types of trimmers and/or edgers, but the does not include a category or subcategory for String Trimmers. Similarly, in many embodiments, existing product taxonomy 400 does not include further refinements of String Trimmers, such as Electric String Trimmers or Gas String Trimmers. As yet another example, the popularity of the Disney movie Frozen has resulted in a high, but likely temporary, demand for Frozen-related products, such as Frozen action figures, Frozen DVDs, Frozen CDs, Frozen books, Frozen nightgowns, Frozen bedding sets, Frozen party supplies, etc. Each of these types of products can be a fine-grained clustering of products that is not included in existing product taxonomy 400. Furthermore, in many embodiments, the clustering of products within the nodes of existing product taxonomy 400 can segregate natural groups of products across the nodes. For example, the Frozen products described above could be categorized into several different and unrelated nodes of existing product taxonomy 400.

In many embodiments, system 300 (FIG. 3) can generate dynamic product groups. In a number of embodiments, each dynamic product group can be based on a coherent intent, such that the dynamic product groups are finer-grained than the nodes in existing product taxonomy 400 (FIG. 4). For example, a coherent intent for a dynamic product group can cover a specific, narrow group of products, such as Frozen Bedding Sheets or Spider-Man Action Figures.

In several embodiments, the dynamic product groups can be demand-driven, such that system 300 (FIG. 300) can generate dynamic product groups for products that have a high demand in the current market. In several embodiments, system 300 (FIG. 3) can predict the current demand based on traffic on the online retailer's internal (on-site) traffic. For example, internal search volumes can be tracked all for internal searches for a keyword occurring at each time period (e.g., hour, day, etc.). In many embodiments, internal search volumes can be represented as a list of (keyword, search volume, timestamp) triplets. For example, if the timestamps are tracked daily, there can be a triplet stored each day and for each keyword searched. The volume of the keyword searched can be represented in the search volume field of the triplet. For example, a triplet can record that "Disney frozen bedding sheets" was search 185 times on a certain day.

Internal search volumes can be different than product-related search volumes on an external search engine, such as Google, Yahoo, or Bing. A challenge can be that an online retailer can have only have a small portion of the data regarding search volumes on external search engines. In many embodiments, system 300 (FIG. 3) can predict the external (out-of-site) traffic based on the internal search volumes, search engine marketing (SEM) statistics, and/or a top query list provided by one or more external search engine. In various embodiments, SEM statistics can include information provided by an external search engine regarding the number of searches, impressions, clicks, etc. for advertisements listed on the external search engine that were paid for by the online retailer. In several embodiments, the top query list can be provided by an external search engine based on the top search queries (e.g., top 2,000 search queries) that returned the site of the online retailer, which can be provided such as through Google Webmaster Tools. For example, Google Webmaster Tools can report impressions, clicks, and page rank at Google for a keyword if the keyword has resulted in traffic to the online retailer. In many embodiments, the top query list can be used as training data.

In some embodiments, system 300 (FIG. 3) can use a statistical method to correlate the available out-of-site traffic and the corresponding on-site traffic. A resulting model can take a time-series of internal search volumes for a keyword as inputs, and output the external (out-of-site) search volume. In many embodiments, the external search volume (ESV) for a keyword can be approximately equal to the linear function of a feature vector. For example, a feature vector f can represent internal search volumes for a particular keyword across a time series, such as each of the previous twelve months of a year, such that for $f=[f_1, f_2, \ldots, f_m]$, $f_1$ can represent the search volumes of the keyword for April 2013, $f_2$ can represent the search volumes for May 2013, and $f_m$ (where m=12) can represent the search volumes for March 2014. In many embodiments, the internal search volumes represented by the feature vector f can include the internal search volumes and the SEM search volumes. A linear function, F, of the feature vector f, can be equal to a dot product of an unknown weight vector w and the feature vector f. In other words, $$ESV \sim F(f_1, f_2, \ldots, f_m) = w^T f$$

In some embodiments, to learn the weights of the weight vector $w=[w_1, w_2, \ldots, w_m]$ corresponding to the features of the feature vector $f=[f_1, f_2, \ldots, f_m]$, system 300 (FIG. 3) can use a linear regression model with the following formulation:

$$\min \text{alpha} \times \|w\|_1 + (1-\text{alpha}) \times \|w\|_2 + \|SV - F(\cdot)\|_2 \quad (1)$$

such that $w_i$ for all i, where alpha is an unknown parameter having a real value, SV is a training data vector with elements corresponding to the each of the keywords in the top query list of an external search engine, and (•) represents a feature vector in which each component corresponds to a keyword. In many embodiments, system 300 (FIG. 3) can learn the weights in weight vector w to minimize formulation 1, and select an appropriate value of alpha. In many embodiments, the weight vector w and the parameter alpha can be used to predict external search volumes for a feature vector for which there is no training data available. In many embodiments, the external search volumes can be represented as a list of (keyword, search volume) pairs. In several embodiments, the top pairs in the list can be high-demand keywords for products in the current online search markets.

In a number of embodiments, system 300 (FIG. 3) can generate the dynamic product groups based on the high-demand keywords. In some embodiments, the product group generation can use the high-demand keywords, such as those determined by the process described above. In a number of embodiments, the high-demand keywords can be clustered based on similar intents. In several embodiments, the high-demand keywords can be clustered into high-demand keyword clusters based on text features, such as stemming, and/or based on product-category features, such that the keywords of "black iPod cases" and "black iPod covers" can be grouped in the same cluster. In a number of embodiments, a cluster centroid, which is also a keyword, can be used as a representative keyword for the cluster.

In various embodiments, system 300 (FIG. 3) can generate dynamic product groups by compiling the most relevant products for the high-demand keyword clusters, which can beneficially meet the current online market demand. In several embodiments, system 300 (FIG. 3) can search the inventory of products using the high-demand keywords clusters to generate relevant item clusters. In many embodiments, the relevance can be based on a conventional relevance weighting statistical measurements, such as term frequency—inverse document frequency (TF-IDF). In a number of embodiments, the items can be clustered using a conventional data clustering algorithm, such as density-based spatial clustering of application with noise (DB-SCAN). In several embodiments, each item in a relevant item cluster can have a category path in existing product taxonomy 400 (FIG. 4). In many embodiments, system 300 (FIG. 3) can correlate the relevant item clusters to existing product taxonomy 400 (FIG. 4) for each high-demand keyword cluster, based on the classification in existing product taxonomy 400 (FIG. 4) of each item in a relevant item clusters. In many embodiments, for each high-demand keyword clusters, system 300 (FIG. 3) can build a tree of the items in the relevant item cluster based on the classification of the items in existing product taxonomy 400 (FIG. 4).

Figure 5:
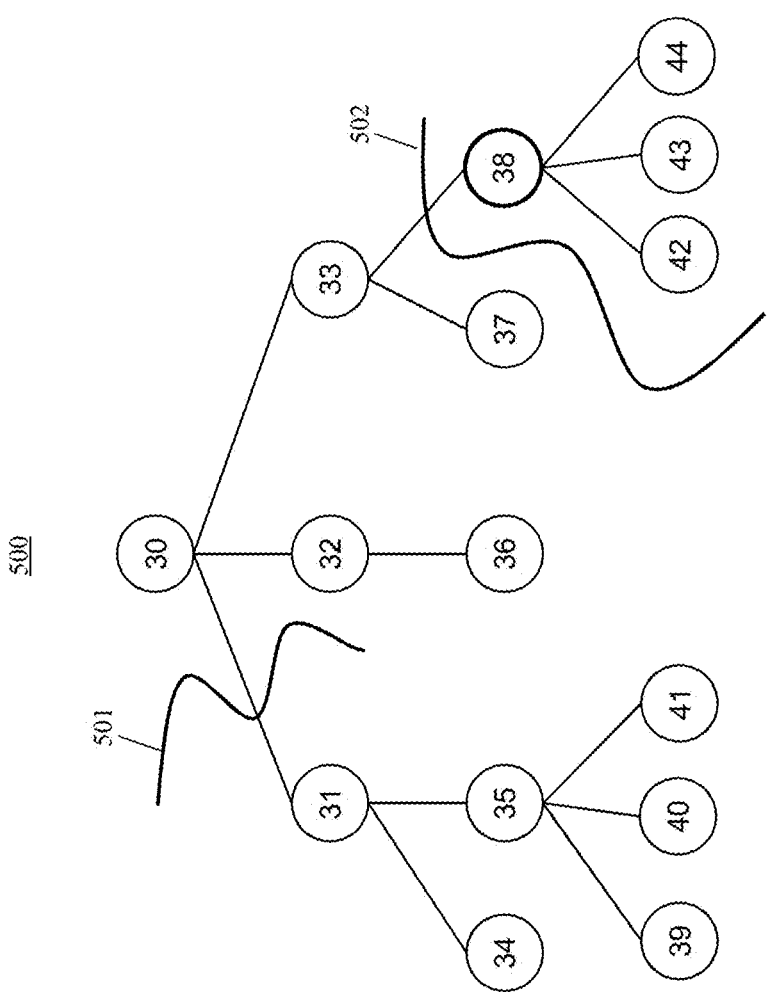
FIG. 5 illustrates an exemplary tree for determining a category path, according to the embodiment of FIG. 3.

Turning ahead in the drawings, FIG. 5 illustrates an exemplary tree 500 for determining a category path, according to an embodiment. Tree 500 is merely exemplary and embodiments of the system are not limited to the embodiments presented herein. The tree can be employed in many different embodiments or examples not specifically depicted or described herein. In several embodiments, tree 500 can include various nodes. In many embodiments, the nodes of tree 500 can include a node that can correspond to each node of existing taxonomy structure 400 (FIG. 4) in which there are items in the relevant item cluster. For example, if the items in the relevant item cluster are found in nodes 0, 1, 2, 3, and 4 of existing taxonomy structure 400 (FIG. 4), then tree 500 can have nodes corresponding to each of those node of existing taxonomy structure 400. As shown in FIG. 5, tree 500 can include various nodes, such as nodes 30-44, for example. In many embodiments, for example, node 30 can be a root of the tree representing All Departments, node 31 can represent the Electronic department, node 32 can represent Home Improvement, and node 33 can represent Toys. The nodes in each subtree of nodes 31-33, and can be further sub-categorizations, based on existing product taxonomy 400 (FIG. 4).

In a number of embodiments, each of the items in each node of tree 500 has a relevance score, based on its relevance to the high-demand keyword cluster. Based on this relevance score, system 300 (FIG. 3) can prune and/or suppress subtrees in tree 500. For example, if a node or group of nodes in tree 500 has low relevance scores compared to the other nodes, that node or groups of nodes can be pruned (e.g., removed) from tree 500. For example, as shown in FIG. 5, the items in node 31 can collectively have low relevance scores, so node 31, and each of the nodes in the subtree rooted at node 31 can be pruned, as shown by pruning line 501. As another example, if multiple child nodes at a same level under a parent node have relevance scores that are approximately evenly distributed, the child nodes, and any sub-nodes, can be eliminated, and the parent node can be made a super-node. For example, if the relevance scores for items in nodes 42-44 are approximately uniformly distributed across nodes 42-44, which are the child nodes of parent node 38, system 300 (FIG. 3) can suppress nodes 42-44 and merge them into super-node 38, as shown by suppression line 502. In several embodiments, after pruning and/or suppressing tree 500, system 300 (FIG. 3) can determine the leaf node of the tree having the highest relevance score. In many embodiments, system 300 (FIG. 3) can select the category path for the relevant-item cluster that is associated with each high-demand keyword cluster. In a number of embodiments, system 300 (FIG. 3) can select the category path based on the leaf node having the highest relevance score. To illustrate, for example, if node 36 has a highest relevance score, system 300 (FIG. 3) can select a category path of 30→32→36. In many embodiments, the category path selected can be used as the category path for the dynamic product group associated with each high-demand keyword cluster.

In several embodiments, the dynamic product group for each high-demand keyword cluster can be the relevant item cluster associated with the high-demand keyword cluster. In a number of embodiments, the relevant item cluster can be further filtered to generate the dynamic product group be applying one or more facet selection filters. For example, in many embodiments, each item in the relevant item cluster can have one or more attributes, such as brand, color, etc. In many embodiments, system 300 (FIG. 3) can create a histogram of all values associated with an attribute for the items in the relevant item cluster. For example, for the attribute of brand, there can be 10 products having a brand of Apple, 6 products having a brand of Samsung, 2 products having a brand of Motorola, and 1 product having a brand of Sony. In this example, Apple is the most common value for the brand attribute. In many embodiments, system 300 can determine n-grams of the keywords of the high-demand keyword cluster (e.g., the centroid keyword and/or the clustered keywords), and match those n-grams to values in the histograms. In many embodiments, if a value in a histogram has a high frequency and matches the n-grams for the keywords of the high-demand keyword cluster, it can be used as a filter, such that the dynamic product group includes only products having that value. As another embodiment, if a value in a histogram has a low enough frequency, it can be used as a filter such that the dynamic product group does not include products having that value.

In several embodiments, the dynamic product group associated with each high-demand keyword cluster can be represented by a (keyword, title, category path, item set) tuple. In many embodiments, the keyword can be the keyword centroid for the high-demand keyword cluster. In a number of embodiments, the category path can be the category path selected using tree 500 (FIG. 5). In several embodiments, the title can be based on keyword, can be assigned by an analyst, or can be crowd-sourced. In many embodiments, the item set can be the relevant item cluster. In a number of embodiments, the item set can be the relevant item cluster after filtering by the one or more facet selection filters.

In various embodiments, the dynamic product groups generated by system 300 (FIG. 3) can be isolated and flat among themselves. In several embodiments, system 300 can build a relation graph, in which each dynamic product group can be a vertex, and a pair of vertices can be connected by an edge if the vertices have a relation. In many embodiments, the relation graph can beneficially make the dynamic product groups well-structured.

In some embodiments, the relation graph can be a parent-child relation graph based on title suffix matching. In many embodiments, the title of the dynamic product group can be used for title suffix matching. In several embodiments, a product group with the most generic title can be the parent of product groups with more specific titles containing their parent's title as a suffix. For example, a product group with the title of "string trimmer" can be the parent of product groups with the titles of "gas string trimmer" and "electric string trimmer." In various embodiments, the relation graph can define the parent-child relationship between a pair of dynamic product groups. In many embodiments, the relation graph can renders such a relation of two product groups by means of adding the parent-child edge to the corresponding vertices in the relation graph. In several embodiments, the relation graph can have a forest structure (e.g., a set of parent-child trees).

In a number of embodiments, the relation graph can be a semantic relation graph, which can be based on item overlapping. For example, a dynamic product group can include a list of relevant items. The included items can be an appropriate representation of the dynamic product group. Because the items are relevant in semantics, a dynamic product group similarity can be the portion of items shared by two dynamic product groups. Formally, the dynamic product group similarity can be the Jaccard index of the item sets of the two dynamic product groups. The dynamic product group similarity can define a relation of a pair of dynamic product groups, and the degree of similarity can indicate the strength of the relation. System 300 (FIG. 3) can generate the relation graph based on the dynamic product group similarity of dynamic product groups. In many embodiments, the relation graph can contain multiple connected components, each of which can be a cluster of dynamic product groups which can be similar in semantics. As an example, a dynamic product group for flat screen televisions (TVs) and a dynamic product group for 42 inch high definition televisions (HDTVs) can have a significant overlap and can be linked in the relation graph.

In several embodiments, the relation graph can be a co-visit relation graph. In several embodiments, the co-visit relation graph can be based on co-visit history. For example, two dynamic product groups can have a relation if both of them are frequently visited within a customer's visit chain to the website of the online retailer. The product group relation can be defined as the co-visit frequency of two dynamic product groups across the visit sessions of all customers. In several embodiments, the co-visit relation can be used to discover out-of-semantics relationships between two dynamic product groups. For example, diapers and beer are commonly purchased together, but they are not related at a semantic level. As such, diapers and beer have a frequent co-occurrence in markets. As another example, milk and bread have a frequent co-occurrence in markets. In several embodiments, the relation graph can include a co-visit edge to connect the corresponding vertices of a pair of dynamic product groups in the relation graph if the pair of dynamic product groups include the co-visit relationship. In many embodiments, the graph structure of the co-visit relation graph can be similar in form to the semantic relation graph.

In a number of embodiments, the relation graph can be a superimposition of two or more of the parent-child relation graph, the semantic relation graph, and/or the co-visit relation graph.

In several embodiments, each of the vertices of the relation graph can be a node representing a dynamic product group. The edges linking the vertices can be relation links. In many embodiments, the nodes can be represented by a webpage, which can include a listing of the items in the dynamic product group. In several embodiments, the webpage can include links, such as hyperlinks to other dynamic product groups based on the relation links. In many embodiments, the dynamic product groups can be used to extend existing product taxonomy 400 (FIG. 4).

Figure 6:
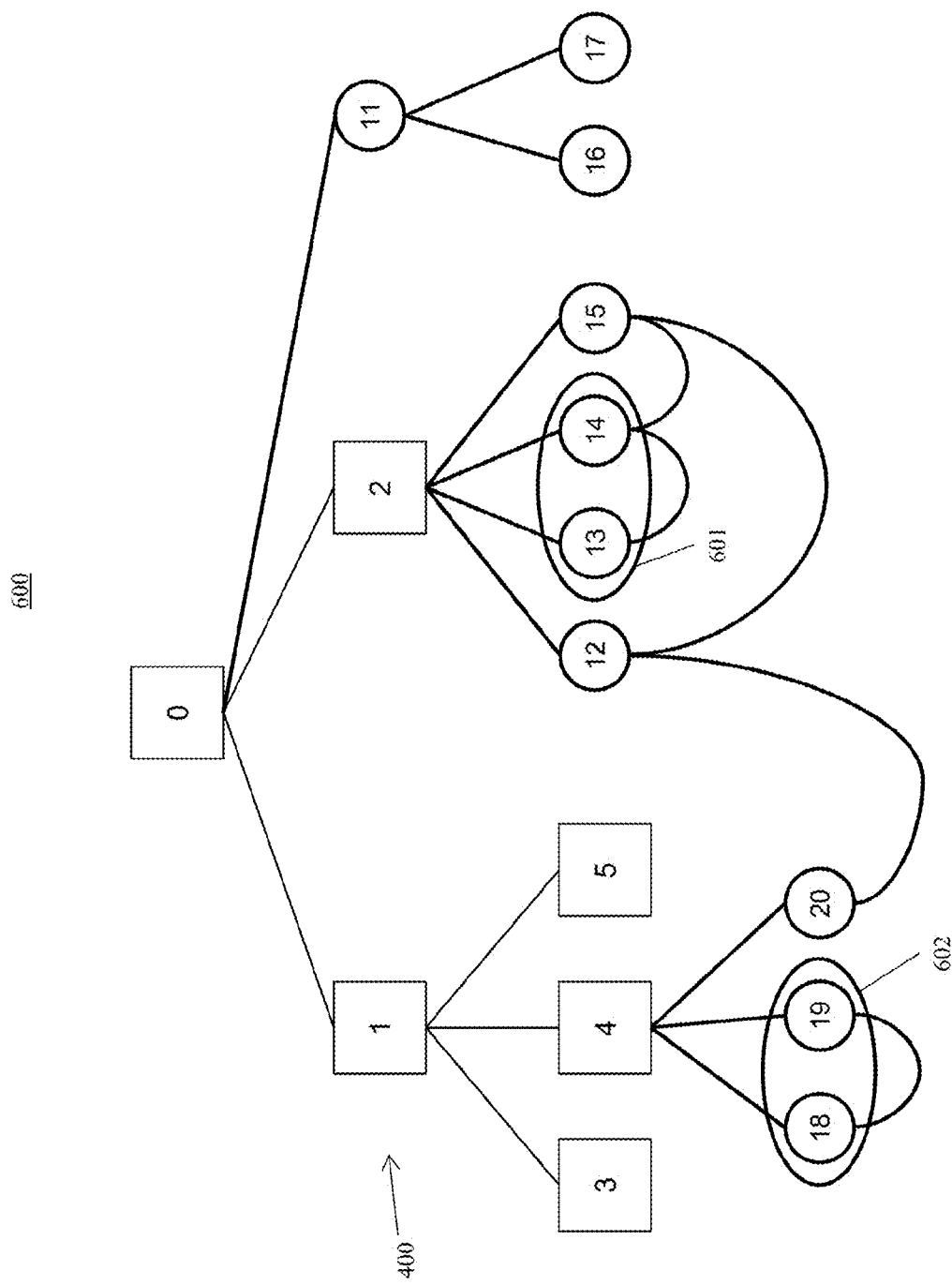
FIG. 6 illustrates an exemplary portion of an extended product taxonomy, according to the embodiment of FIG. 3.

Turning ahead in the drawings, FIG. 6 illustrates an exemplary portion of an extended product taxonomy 600, represented as a tree structure, according to an embodiment. Extended product taxonomy 600 is merely exemplary and embodiments of the system are not limited to the embodiments presented herein. The extended product taxonomy can be employed in many different embodiments or examples not specifically depicted or described herein. In many embodiments, the tree structure of the existing product taxonomy can include existing product taxonomy 400, such as nodes 0-5. The nodes of existing product taxonomy 400 are represented by boxes in FIG. 6. In several embodiments, extended product taxonomy 600 can include the dynamic product groups, such as nodes 11-20, which are represented by circles in FIG. 6.

In many embodiments, system 300 (FIG. 3) can use the category path of the dynamic product group to link the dynamic product group to a particular department, category, or subcategory node (e.g., nodes 0-5) in existing product taxonomy 400. For example, as shown in FIG. 6, the dynamic product group represented by node 11 can be linked to node 0 of existing product taxonomy 400. Similarly, the dynamic product groups represented by nodes 12-15 can be linked to node 2 of existing product taxonomy 400. Further, the dynamic product groups represented by nodes 18-20 can be linked to node 4 of existing product taxonomy 400. By linking the dynamic product groups to existing product taxonomy 400, system 300 can extend existing product taxonomy 400. In many embodiments, a hyperlink can be added to attach a dynamic product group to the webpage of a node in existing product taxonomy 400. In several embodiments, a webpage for a node in existing product taxonomy 400 can have hyperlinks to the linked dynamic product groups.

In various embodiments, various dynamic product groups can be linked to each other based on the relation links of the relation graph. For example, the dynamic product groups can be cross-linked with each other based on their similarity, as defined in the relation graph. As shown in FIG. 6, node 11 can be linked to nodes 16 and 17. Similarly, there can be relation links between nodes 13 and 14, between nodes 14 and 15, between nodes 12 and 15, between nodes 12 and 20, and between nodes 18 and 19. In certain embodiments, two or more nodes representing dynamic product groups can be grouped in a mashup group, such as mashup group 601, which includes nodes 13 and 14, and/or mashup group 602, which includes nodes 18 and 19. For example, in some embodiments a mashup group can group dynamic product groups with a relation, such as title suffix matching. For example, a mashup group for Action Figures can include dynamic product groups for Spider-Man Action Figures, Batman Action Figures, Marvel Select Action Figures, etc.

In many embodiments, the attachment of the dynamic product groups to existing product taxonomy 400 can beneficially provide extended product taxonomy 600 with a richly-structured product taxonomy. For example, extended product taxonomy 600 can be deeper and/or wider than existing product taxonomy 400. Further, extended product taxonomy 600 can be not limited to a hierarchical tree structure. For example, a dynamic product group of Spider-Man Action Figures can be linked under Spider-Man Toys in existing product taxonomy 400 and also under Action Figures in existing product taxonomy 400.

In many embodiments, the dynamic product groups can be generated and/or changed frequently based on demand, which can advantageously allow extended product taxonomy 600 to allow browsing that meets the current market demand. Further, extended product taxonomy 600 can be continuously-evolving with the marketplace. In several embodiments, linking the dynamic product groups to existing product taxonomy 400 can beneficially maintain the existing taxonomy and meanwhile complement it to add additional product groups. In several embodiments, at least some of the dynamic product groups of extended product taxonomy 600 can be fine-grained and based on coherent intents, such that a user can further drill down while browsing to find a group of products that match the user's specific intent. For example, a user can browse the taxonomy and find Frozen Bedding Sheets or Spider-Man Action Figures. In many embodiments, the dynamic product groups can be different from a search results webpage on the website of the online retailer, as the items in the dynamic product group can be pre-selected.

In a number of embodiments, the dynamic product groups of extended product taxonomy 600 can be optimized for generating search traffic to the website of the online retailer from one or more external search engines. At many search engines, site exposure can be based on content and cross-linking. Further, search demand can constantly change. In many embodiments, the dynamic product groups in extended product taxonomy 600 can be tailored to match the current search demand of external search engines and/or can be cross-linked through extended product taxonomy 600 based on the relation links in the relation graph and the links to existing product taxonomy 400. Extensive cross-linking can advantageously enrich the structure of product taxonomy and can beneficially boost exposure to the website of the online-retailer at the external search engines.

Figure 7:
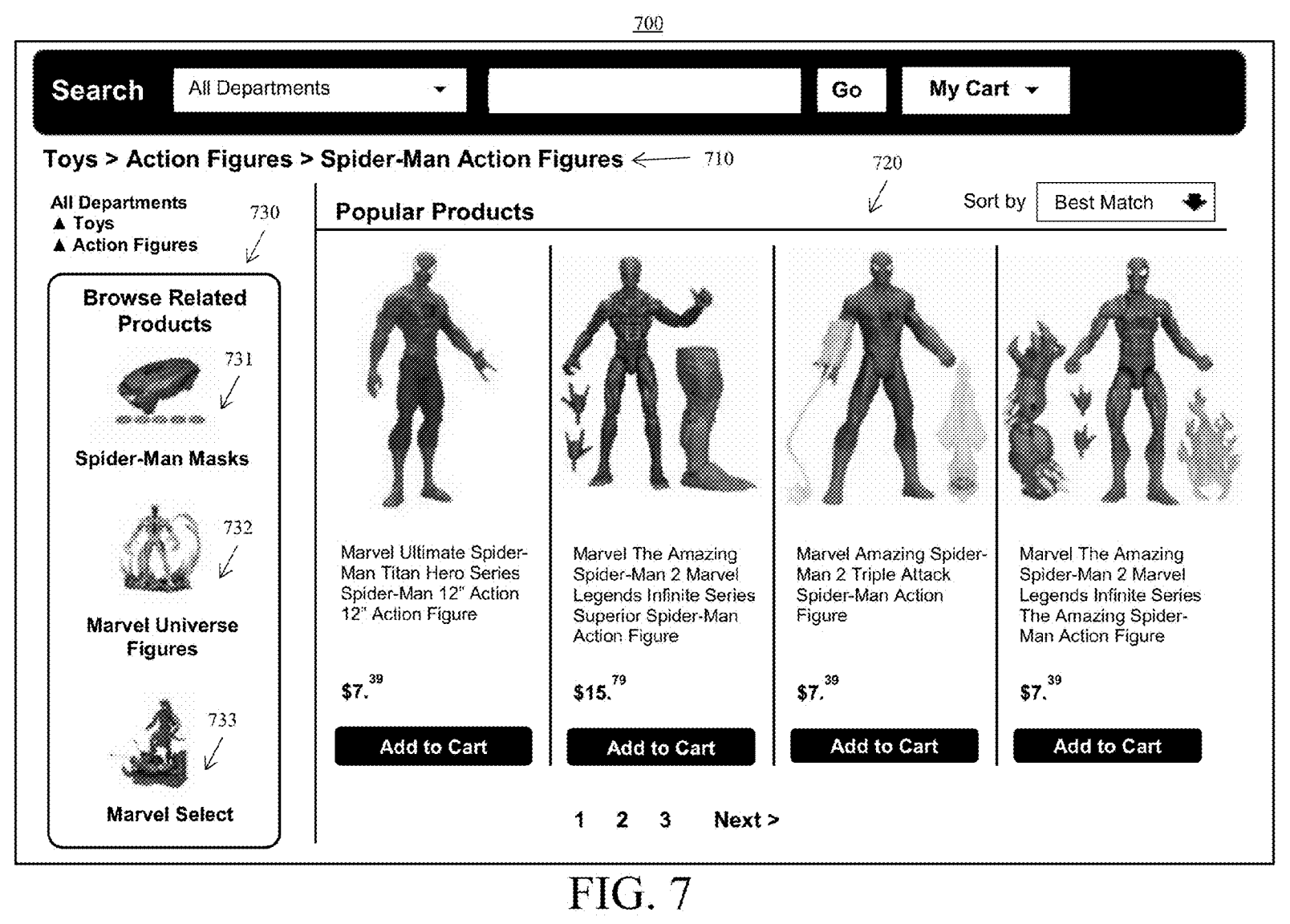

Turning ahead in the drawings, FIG. 7 illustrates an exemplary webpage 700 showing a dynamic product group, according to various embodiments. Webpage 700 is merely exemplary, and embodiments for extending an existing product taxonomy can be employed in many different embodiments or examples not specifically depicted or described herein. In some embodiments, web server 320 (FIG. 3) can provide a webpage, such as webpage 700, to one or more of user computers (e.g., 340-344 (FIG. 3)), which can allow a user to browse the website of the online retailer based on extended product taxonomy 600 (FIG. 6).

In many embodiments, webpage 700 can be associated with a dynamic product group. For example, webpage 700 can feature the dynamic product group for Spider-Man Action Figures. In many embodiments, webpage 700 can include a taxonomy path 710, which can represent a path to the dynamic product group in extended product taxonomy 600 (FIG. 6). For example, as shown in FIG. 7, taxonomy path 710 can be Toys>Action Figures>Spider-Man Action Figures. In many embodiments, Toys and Action Figures can be part of existing product taxonomy 400 (FIGS. 4, 6), and Spider-Man Action Figures can be a dynamic product group that is added to existing product taxonomy 400 (FIGS. 4, 6) in extended product taxonomy 600 (FIG. 6). In some embodiments, taxonomy path 710 can include the category path of the dynamic product group. In a number of embodiments, webpage 700 can allow the user to further browse extended product taxonomy 600 (FIG. 6), such as by selecting Action Figures or Toys. In several embodiments, webpage 700 can include a product listing 720, which can list the items in the dynamic product group, and/or allow the customer to select the items to view, add to cart, etc.

In a number of embodiments, webpage 700 can display links to other dynamic product groups that are related to the dynamic product group featured in webpage 700. For example, webpage 700 can include a related links group 730. Related links group 730 can list links to other dynamic product groups that have relation links in extended product taxonomy 600 to the dynamic product group featured in webpage 700. For example, related links group can include a link 731 to a dynamic product group for Spider-Man Masks, a link 732 to a dynamic product group for Marvel Universe Figures, and/or a link 733 to a dynamic product group for Marvel Select. In many embodiments, these dynamic product groups linked to by links 731-733 can have relation links to the dynamic product group for Spider-Man Action Figures featured in webpage 700. In several embodiments, links 731-733 can allow the user to further browse extended product taxonomy 600 (FIG. 6).

Figure 8:
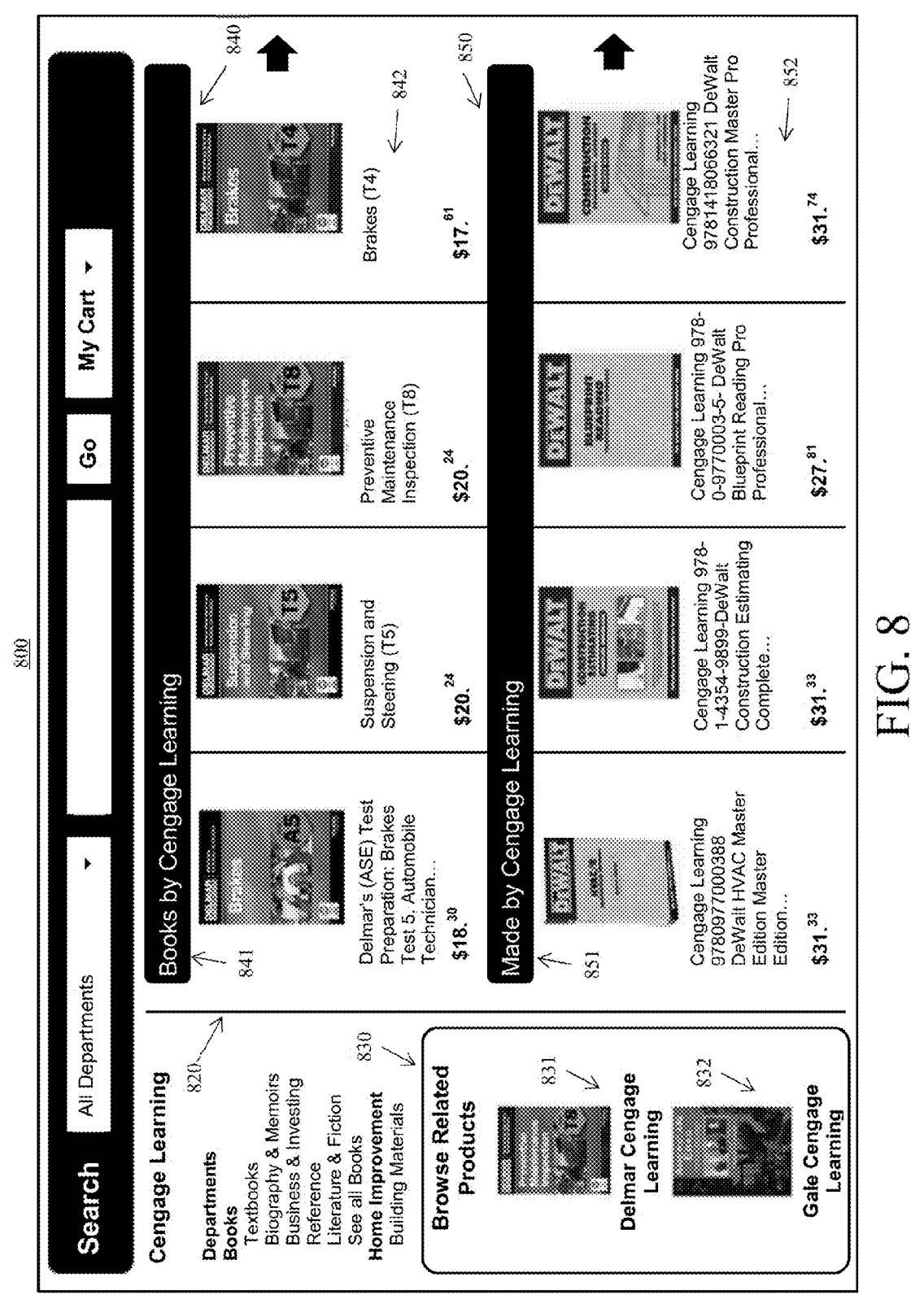

Turning ahead in the drawings, FIG. 8 illustrates an exemplary webpage 800 showing a mashup group, according to various embodiments. Webpage 800 is merely exemplary, and embodiments for extending an existing product taxonomy can be employed in many different embodiments or examples not specifically depicted or described herein. In some embodiments, web server 320 (FIG. 3) can provide a webpage, such as webpage 800, to one or more of user computers (e.g., 340-344 (FIG. 3)), which can allow a user to browse the website of the online retailer based on extended product taxonomy 600 (FIG. 6).

In many embodiments, webpage 800 can be associated with a mashup group, such as mashup group 601 (FIG. 6) or mashup group 602 (FIG. 6). In various embodiments, the mashup group can include one or more dynamic product groups. In several embodiments, webpage 800 can include mashup display 820, which can include a product group display for each of the dynamic product groups in the mashup group. For example, as shown in FIG. 8, mashup display 820 can include a product group display 840 and a product group display 850. Product group display 840 can include a title 841 for the dynamic product group, which can feature Books by Cengage Learning. In several embodiments, product group display 840 can include a product listing 842, which can list the items in the dynamic product group, and/or allow the customer to select the items to view, add to cart, etc. Similarly, product group display 850 can include a title 851 for the dynamic product group, which can feature Made by Cengage Learning. In several embodiments, product group display can include a product listing 852, which can list the items in the dynamic product group, and/or allow the customer to select the items to view, add to cart, etc.

In a number of embodiments, webpage 800 can display links to other dynamic product groups that are related to the dynamic product groups in the mashup group featured in webpage 800. For example, webpage 800 can include a related links group 830. Related links group 830 can list links to other dynamic product groups that have relation links in extended product taxonomy 600 (FIG. 6) to the dynamic product groups of the mashup group featured in webpage 800. For example, related links group can include a link 831 to a dynamic product group for Delmar Cengage Learning, and/or a link 832 to a dynamic product group for Gale Cengage Learning. In many embodiments, these dynamic product groups linked to by links 831-832 can have relation links to the dynamic product groups for Books by Cengage Learning and/or Made by Cengage Learning, as featured in webpage 800.

Figure 9:
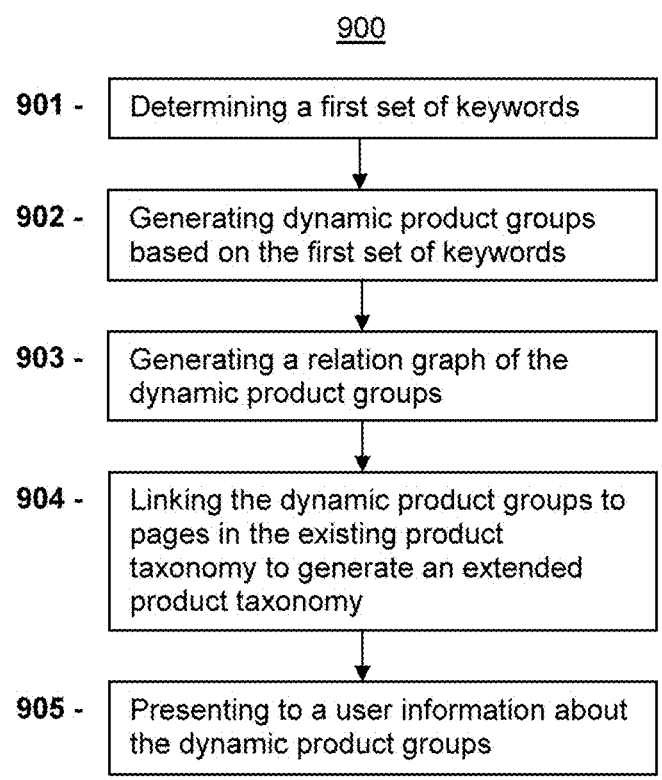
FIG. 9 illustrates a flow chart for a method of extending an existing product taxonomy for an inventory of products, according to another embodiment.

Turning ahead in the drawings, FIG. 9 illustrates a flow chart for a method 900 of extending an existing product taxonomy for an inventory of products, according to an embodiment. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In some embodiments, method 900 can be implemented by web server 320 (FIG. 3) and/or computation server 310 (FIG. 3). In many embodiments, the existing product taxonomy can be similar or identical to existing product taxonomy 400 (FIG. 4). In several embodiments, the existing product taxonomy can include pages having a hierarchical tree structure.

Referring to FIG. 9, in some embodiments method 900 can include a block 901 of determining a first set of keywords. In many embodiments, the first set of keywords can be the high-demand keywords. In a number of embodiments, the first set of keywords can be a prediction of keywords searched above a predetermined threshold during a predetermined time period of one or more external search engines. For example, the first set of keywords can be a prediction of the top 100, 500, 1000, 5000, 10000, or other suitable number of keywords searched on the external search engine during a day, month, year, or other suitable time period. In many embodiments, the first set of keywords can be current highly searched keywords of one or more external search engines. In some embodiments, determining the first set of keywords can be based on at least one of internal search volumes or search engine marketing volumes, and/or based on a top query list for the one or more external search engines, as described above. In various embodiments, determining the first set of keywords can include using a linear-regression time-series machine-learning model to predict the keywords searched above the predetermined threshold during the predetermined time period of the one or more external search engines, as described above.

Figure 10:
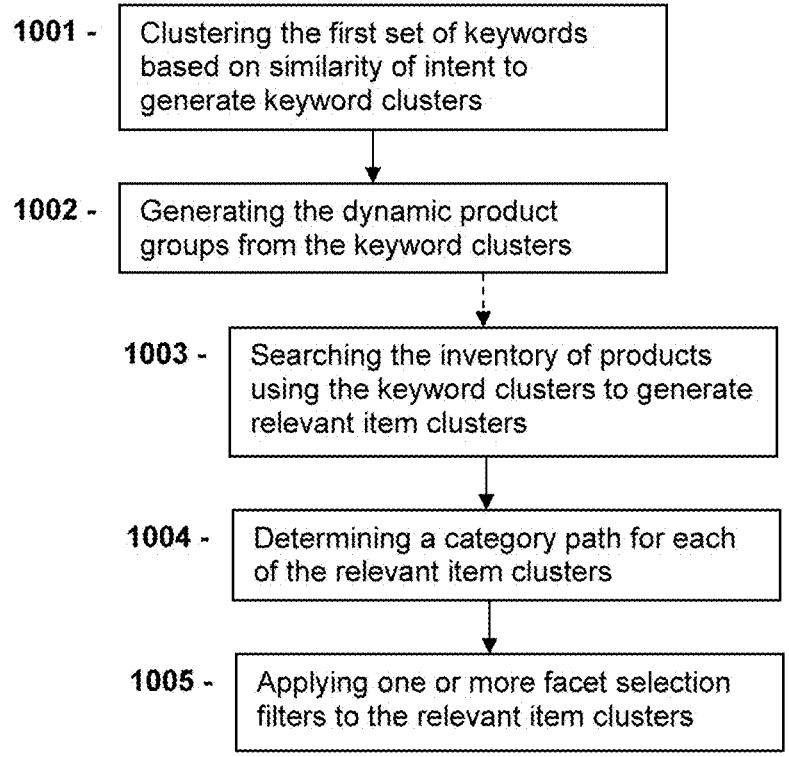
FIG. 10 illustrates a flow chart for a method of generating dynamic product groups based on the high-demand keywords, according to the embodiment of FIG. 9.

In a number of embodiments, method 900 can continue by including a block 902 of generating dynamic product groups based on the first set of keywords. Block 902 can include various embodiments in which dynamic product groups are generated based on first set of keywords. For example, block 903 of generating dynamic product groups based on the first set of keywords can be implemented as shown in FIG. 10 and described below.

In some embodiments, method 900 can next include a block 903 of generating a relation graph of the dynamic product groups. In many embodiments, the relation graph can include relation links between the dynamic product groups, as described above. In a number of embodiments, the relation graph can be a parent-child relation graph. In various embodiments, the relation links between the dynamic product groups can be based on title suffix matching, as described above. In some embodiments, the relation graph can be a semantic relation graph. In several embodiments, the relation links between the dynamic product groups can be based on a similarity of items in the dynamic product groups, as described above. In certain embodiments, the similarity of items in the dynamic product groups can be measured by a Jaccard index. In various embodiments, the relation graph can be a co-visit relation graph. In several embodiments, the relation links between the dynamic product groups can be based on a co-visit history of the dynamic product groups, as described above. In many embodiments, the relation graph can be a superimposition of at least two of a parent-child relation graph, a semantic relation graph, and/or a co-visit relation graph.

In a number of embodiments, method 900 can continue by including a block 904 of linking the dynamic product groups to pages in the existing product taxonomy to generate an extended product taxonomy. In many embodiments, the extended product taxonomy can be similar or identical to extended product taxonomy 600 (FIG. 6) In several embodiments, the extended product taxonomy can include the existing product taxonomy. In many embodiments, the extended product taxonomy can include the dynamic product groups. In various embodiments, the extended product taxonomy can include the relation links of the relation graph between the dynamic product groups. In a number of embodiments, block 904 can include adding hyperlinks to the pages in the existing product taxonomy to link to the dynamic product groups based on category paths for the dynamic product groups.

In some embodiments, method 900 can next include a block 905 of presenting to a user information about the dynamic product groups. In several embodiments, the information about the dynamic product groups can be presented to the user by sending the information to a user computer (e.g., 340-344 (FIG. 3)) for display on the screen of the user computer. In other embodiments, the information can be presented to the user by printing or otherwise presenting or publishing the output to the user. In various embodiments, block 905 can include presenting to the user a taxonomy path of the extended product taxonomy for one of the dynamic product groups. In many embodiments, the taxonomy path can be similar or identical to taxonomy path 710, as shown in FIG. 7. In several embodiments, block 905 can include presenting to the user related links for one of the dynamic product groups based on the relation links of the relation graph corresponding to the one of the dynamic product groups. In some embodiments, the related links can be similar or identical to links 731-733 (FIG. 7) and/or links 831-832 (FIG. 8). In various embodiments, block 905 can include presenting to the user a mashup of dynamic product groups based on category paths of the dynamic product groups and the relation links of the relation graph. For example, the mashup can be similar or identical to mashup display 820, as shown in FIG. 8.

Turning ahead in the drawings, FIG. 10 illustrates a flow chart for an embodiment of block 902 of generating dynamic product groups based on the first set of keywords. Block 902 is merely exemplary and is not limited to the embodiments presented herein. Block 902 can be employed in many different embodiments or examples not specifically depicted or described herein. In some embodiments, the procedures, the processes, and/or the activities of block 902 can be performed in the order presented. In other embodiments, the procedures, the processes, and/or the activities of block 902 can be performed in any suitable order. In still other embodiments, one or more of the procedures, the processes, and/or the activities of block 902 can be combined or skipped.

Referring to FIG. 10, in some embodiments block 902 can include a block 1001 of clustering the first set of keywords based on similarity of intent to generate keyword clusters. In many embodiments, the keyword clusters can be the high-demand keyword clusters. For example, clustering the first set of keywords can be based on text features and/or product-category features, as described above.

In a number of embodiments, block 902 can include block 1002 of generating the dynamic product groups from the keyword clusters. Block 1002 can include various embodiments of generating dynamic product groups for the keyword clusters, such as embodiments described above.

In some embodiments, block 1002 can include a block 1003 of searching the inventory of products using the keyword clusters to generate relevant item clusters. Block 1003 can include various embodiments of searching the inventory of products to generate the relevant item clusters, such as embodiments described above.

In a number of embodiments, block 1002 can include a block 1004 of determining a category path for each of the relevant item clusters. In a number of embodiments, the category path can be determined as shown in FIG. 5 and described above. For example, block 1004 of determining a category path for each of the relevant item clusters can be implemented as shown in FIG. 11 and described below.

In some embodiments, block 1002 can include a block 1005 of applying one or more facet selection filters to the relevant item clusters to generate the dynamic product groups. Block 1005 can include various embodiments of applying the facet selection filters to the relevant item clusters to generate the dynamic product groups, such as embodiments described above.

Figure 11:
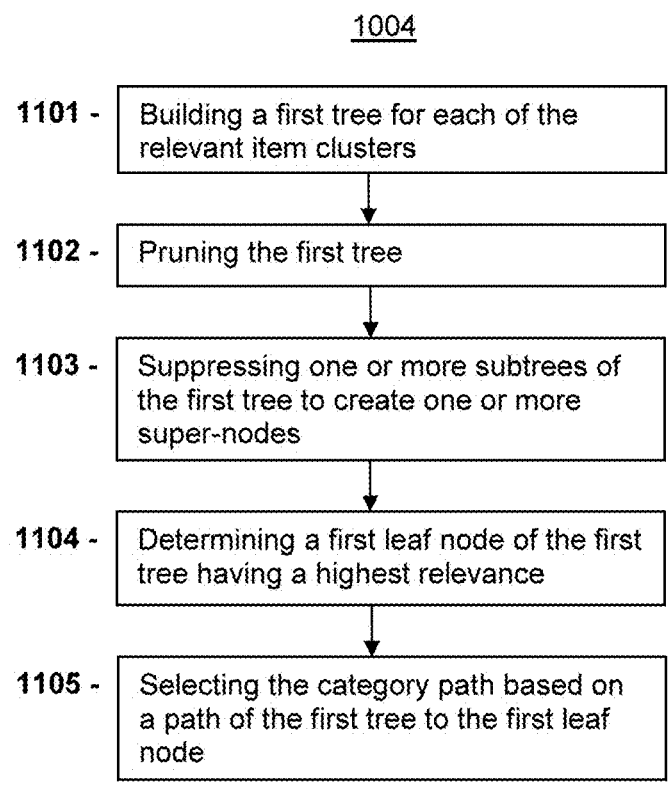
FIG. 11 illustrates a flow chart for a method of determining a category path for each of the relevant item clusters, according to the embodiment of FIG. 10.

Turning ahead in the drawings, FIG. 11 illustrates a flow chart for an embodiment of block 1004 of determining a category path for each of the relevant item clusters. Block 1004 is merely exemplary and is not limited to the embodiments presented herein. Block 1004 can be employed in many different embodiments or examples not specifically depicted or described herein. In some embodiments, the procedures, the processes, and/or the activities of block 1004 can be performed in the order presented. In other embodiments, the procedures, the processes, and/or the activities of block 1004 can be performed in any suitable order. In still other embodiments, one or more of the procedures, the processes, and/or the activities of block 1004 can be combined or skipped.

Referring to FIG. 11, in some embodiments block 1004 can include a block 1101 of building a first tree for each of the relevant item clusters. In many embodiments, the first tree can be similar or identical to tree 500 of FIG. 5. In a number of embodiments, the first tree can include first nodes corresponding to nodes in the hierarchical tree structure of the existing product taxonomy. In various embodiments, the first nodes can include relevant items of the relevant item clusters.

In many embodiments block 1004 can include a block 1102 of pruning the first tree to remove nodes having relevant items with lower relevance scores. For example, nodes having low relevance scores can be pruned, such as shown by pruning line 501 of FIG. 5.

In various embodiments block 1004 can include a block 1103 of suppressing one or more subtrees of the first tree to create one or more super-nodes. In many embodiments, the one or more subtrees can have child nodes having relevant items with relevance scores that are approximately uniformly distributed across the child nodes. For example, a subtree can be suppressed into a super-node as shown by suppression line 502 and node 8 of FIG. 5.

In many embodiments block 1004 can include a block 1104 of determining a first leaf node of the first tree having a highest relevance. For example, the first leaf node can be selected as described above in connection with FIG. 5.

In various embodiments block 1004 can include a block 1105 of selecting the category path based on a path of the first tree to the first leaf node. For example, the category path can be selected as described above in connection with FIG. 5.

Figure 12:
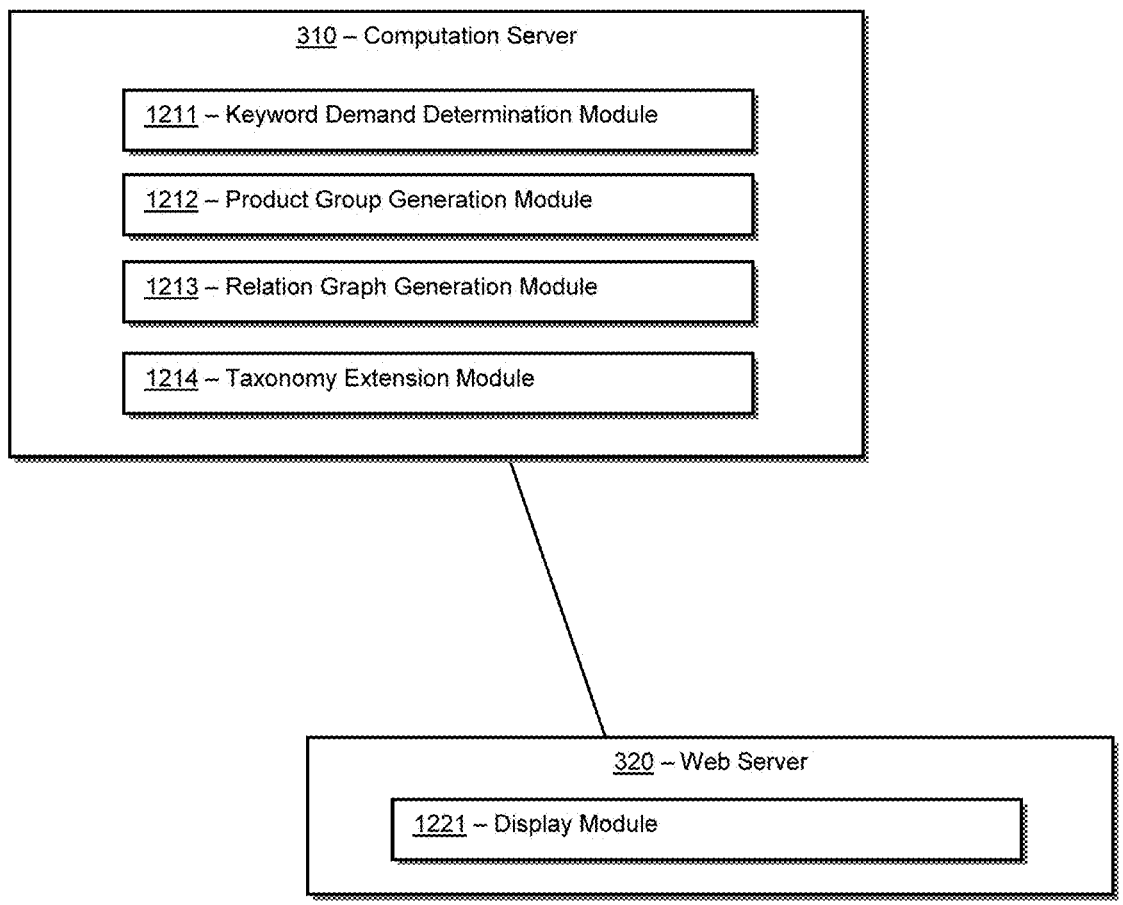
FIG. 12 illustrates a block diagram of the computation server and the web server, according to the embodiment of FIG. 3.

Turning ahead in the drawings, FIG. 12 illustrates a block diagram of system 300, according to the embodiment shown in FIG. 3. Computation server 310 and web server 320 are merely exemplary and are not limited to the embodiments presented herein. Computation server 310 and web server 320 can be employed in many different embodiments or examples not specifically depicted or described herein. In some embodiments, certain elements or modules of computation server 310 and/or web server 320 can perform various procedures, processes, and/or acts. In other embodiments, the procedures, processes, and/or acts can be performed by other suitable elements or modules.

In some embodiments, computation server 310 can include a keyword demand determination module 1211. In certain embodiments, keyword demand determination module 1211 can perform block 901 (FIG. 9) of determining a first set of keywords.

In various embodiments, computation server 310 also can include a product group generation module 1212. In certain embodiments, product group generation module 1212 can perform block 902 (FIG. 9) of generating dynamic product groups based on the first set of keywords, perform block 1001 (FIG. 10) of clustering the first set of keywords based on similarity of intent to generate keyword clusters, perform block 1002 (FIG. 10) of generating the dynamic product groups from the keyword clusters, perform block 1003 (FIG. 10) of searching the inventory of products using the keyword clusters to generate relevant item clusters, perform block 1004 (FIG. 10) of determining a category path for each of the relevant item clusters, perform block 1005 (FIG. 10) of applying one or more facet selection filters to the relevant item clusters to generate the dynamic product groups, perform block 1101 (FIG. 11) of building a first tree for each of the relevant item clusters, perform block 1102 (FIG. 11) of pruning the first tree to remove nodes having relevant items with lower relevance scores, perform block 1103 (FIG. 11) of suppressing one or more subtrees of the first tree to create one or more super-nodes, perform block 1104 (FIG. 11) of determining a first leaf node of the first tree having a highest relevance, and/or perform block 1105 (FIG. 11) of selecting the category path based on a path of the first tree to the first leaf node.

In many embodiments, computation server 310 additionally can include a relation graph generation module 1213. In certain embodiments, relation graph generation module 1213 can perform block 903 (FIG. 9) of generating a relation graph of the dynamic product groups.

In a number of embodiments, computation server 310 also can include a taxonomy extension module 1214. In certain embodiments, taxonomy extension module 1214 can perform block 904 (FIG. 9) of linking the dynamic product groups to pages in the existing product taxonomy to generate an extended product taxonomy.

In various embodiments, web server 320 can include a display module 1221. In certain embodiments, display module 1221 can perform block 905 (FIG. 9) of presenting to a user information about the dynamic product groups.

Although extending an existing product taxonomy has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-12 may be modified, and that the foregoing discussion of certain of these embodiments does not necessarily represent a complete description of all possible embodiments. For example, one or more of the procedures, processes, or activities of FIGS. 9-11 may include different procedures, processes, and/or activities and be performed by many different modules, in many different orders. As another example, the modules within computation server 310 and/or web server 320 in FIG. 12 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of extending an existing product taxonomy for an inventory of products, the existing product taxonomy comprising pages having a hierarchical tree structure, the method being implemented via execution of computer instructions configured to run at one or more processing modules and configured to be stored at one or more non-transitory memory storage modules, the method comprising:
   determining a first set of keywords, the first set of keywords being a prediction of keywords searched above a predetermined threshold during a predetermined time period of one or more external search engines, wherein the determining the first set of keywords comprises using a linear-regression time-series machine-learning model to predict the keywords searched above the predetermined threshold during the predetermined time period of the one or more external search engines;
   generating dynamic product groups based on the first set of keywords comprising:
      generating the dynamic product groups from keyword clusters comprising:
         searching the inventory of products using the keyword clusters to generate relevant item clusters;
         determining a category path for each of the relevant item clusters comprising:
            building a first tree for each of the relevant item clusters, the first tree comprising first node corresponding to nodes in the hierarchical tree structure of the existing product taxonomy, the first node comprising relevant items of the relevant item clusters;
            pruning the first tree to remove nodes having relevant items with lower relevance scores;
            suppressing one or more subtrees of the first tree to create one or more super-nodes, the one or more subtrees having child nodes having relevant items with relevance scores that are approximately uniformly distributed across the child nodes;
            determining a first leaf node of the first tree having a highest relevance; and
            selecting the category path based on a path of the first tree to the first leaf node; and
         applying one or more facet selection filters to the relevant item clusters to generate the dynamic product groups;
   generating a relation graph of the dynamic product groups, the relation graph comprising relation links between the dynamic product groups;

linking the dynamic product groups to pages in the existing product taxonomy to generate an extended product taxonomy, the extended product taxonomy comprising the existing product taxonomy, the dynamic product groups, and the relation links of the relation graph between the dynamic product groups; and presenting to a user information about the dynamic product groups.

2. The method of claim 1, wherein determining the first set of keywords comprises:

determining the first set of keywords based on at least one of internal search volumes or search engine marketing volumes, and based on a top query list for the one or more external search engines.

3. The method of claim 1, wherein generating the dynamic product groups comprises;

clustering the first set of keywords based on similarity of intent to generate the keyword clusters.

4. The method of claim 1, wherein generating the relation graph of the dynamic product groups comprises:

generating the relation graph of the dynamic product groups such that the relation graph comprises a parent-child relation graph, wherein the relation links between the dynamic product groups are based on title suffix matching.

5. The method of claim 1, wherein generating the relation graph of the dynamic product groups comprises:

generating the relation graph of the dynamic product groups such that the relation graph comprises a semantic relation graph, wherein the relation links between the dynamic product groups are based on a similarity of items in the dynamic product groups.

6. The method of claim 5, wherein;

the similarity of items in the dynamic product groups is measured by a Jaccard index.

7. The method of claim 1, wherein generating the relation graph of the dynamic product groups comprises:

generating the relation graph of the dynamic product groups such that the relation graph comprises a co-visit relation graph, wherein the relation links between the dynamic product groups are based on a co-visit history of the dynamic product groups.

8. The method of claim 1, wherein generating the relation graph of the dynamic product groups comprises:

generating the relation graph of the dynamic product groups such that the relation graph comprises a superimposition of at least two of: a parent-child relation graph, a semantic relation graph, or a co-visit relation graph.

9. The method of claim 1, wherein linking the dynamic product groups to pages in the existing product taxonomy to generate the extended product taxonomy comprises:

adding hypedlinks to the pages in the existing product taxonomy to link to the dynamic product groups based on category paths for the dynamic product groups.

10. The method of claim 1, wherein presenting to the user information about the dynamic product groups comprises:

presenting to the user a taxonomy path of the extended product taxonomy for one of the dynamic product groups.

11. The method of claim 1, wherein presenting to the user information about the dynamic product groups comprises:

presenting to the user related links for one of the dynamic product groups based on the relation links of the relation graph corresponding to the one of the dynamic product groups.

12. The method of claim 1, wherein presenting to the user information about the dynamic product groups comprises:

presenting to the user a mashup of dynamic product groups based on category paths of the dynamic product groups end the relation links of the relation graph.

13. A system for extending an existing product taxonomy for an inventory of products, the existing product taxonomy comprising pages having a hierarchical tree structure, the system comprising:

one or more processing modules; and one or more non-transitory memory storage modules storing computing instructions configured to run on the one or more processing modules and perform the acts of;

determining a first set of keywords, the first set of keywords being a prediction of keywords searched above a predetermined threshold during a predetermined time period of one or more external search engines;

generating dynamic product groups based on the first set of keywords comprising:

generate the dynamic product groups from keyword clusters comprising:

searching the inventory of products using the keyword clusters to generate relevant item clusters;

determining a category path for each of the relevant item clusters comprising:

building a first tree for each of the relevant item clusters, the first tree comprising first node corresponding to nodes in the hierarchical tree structure of the existing product taxonomy, the first node comprising relevant items of the relevant item clusters;

pruning the first tree to remove nodes having relevant items with lower relevance scores;

suppressing one or more subtrees of the first tree to create one or more super-nodes, the one or more subtrees having child nodes having relevant items with relevance scores that are approximately uniformly distributed across the child nodes;

determining a first leaf node of the first tree having a highest relevance; and selecting the category path based on a path of the first tree to the first leaf node; and applying one or more facet selection filters to the relevant item clusters to generate the dynamic product groups;

generating a relation graph of the dynamic product groups, the relation graph comprising:

relation links between the dynamic product groups; and a superimposition of at least one of: a parent-child relation graph, a semantic relation graph, or a co-visit relation graph;

linking the dynamic product groups to pages in the existing product taxonomy to generate an extended product taxonomy, the extended product taxonomy comprising the existing product taxonomy, the dynamic product groups, and the relation links of the relation graph between the dynamic product groups; and presenting to a user information about the dynamic product groups.

14. The system of claim 13, wherein determining the first set of keywords comprises:

using a linear-regression time-series machine-learning model to predict the keywords searched above the predetermined threshold during the predetermined time period of the one or more external search engines based on at least one of internal search volumes or search engine marketing volumes, and based on a top query list for the one or more external search engines.

15. The system of claim 13, wherein generating the dynamic product groups comprises:
   clustering the first set of keywords based on similarity of intent to generate the keyword clusters.

16. The system of claim 13, wherein the superimposition comprises the parent-child relation graph.

17. The system of claim 13, wherein the superimposition comprises the semantic relation graph.

* * * * *